United States Patent [19]

Helgesson

[11] 4,088,571

[45] May 9, 1978

[54] METHOD AND APPARATUS FOR BIOLOGICAL PURIFICATION

[75] Inventor: Claes Ivar Helgesson, Akersberga, Sweden

[73] Assignee: Arbman Development AB, Stockholm, Sweden

[21] Appl. No.: 656,811

[22] Filed: Feb. 9, 1976

[30] Foreign Application Priority Data

Feb. 28, 1975 Sweden .............................. 75023069

[51] Int. Cl.² .............................................. C02C 1/04
[52] U.S. Cl. ........................................ 210/17; 210/150
[58] Field of Search .......................... 210/17, 150, 151

[56] References Cited

U.S. PATENT DOCUMENTS

| | | | |
|---|---|---|---|
| 3,617,541 | 11/1971 | Pan | 210/17 |
| 3,929,630 | 12/1975 | Smith | 210/17 |

OTHER PUBLICATIONS

Frobisher, Jr., "Fundamentals of Microbiology," Fifth Edition, 1954, p. 169.
Zaborsky, "Immobilized Enzymes," 1974, CRC Press, p. 164.

Primary Examiner—Thomas G. Wyse
Attorney, Agent, or Firm—Burns, Doane, Swecker & Mathis

[57] ABSTRACT

The invention relates to a method and an apparatus for biological purification in accordance with liquid wastes, the purification being achieved by means of microorganisms on an inert carrier. The improvement of the invention comprises using a carrier, the surface layer of which comprises colloidal silica. The invention also relates to a method of imparting bacteriophilic properties to a silicious material which comprises preparing a layer of colloidal silica thereupon.

24 Claims, 1 Drawing Figure

U.S. Patent  May 9, 1978  4,088,571
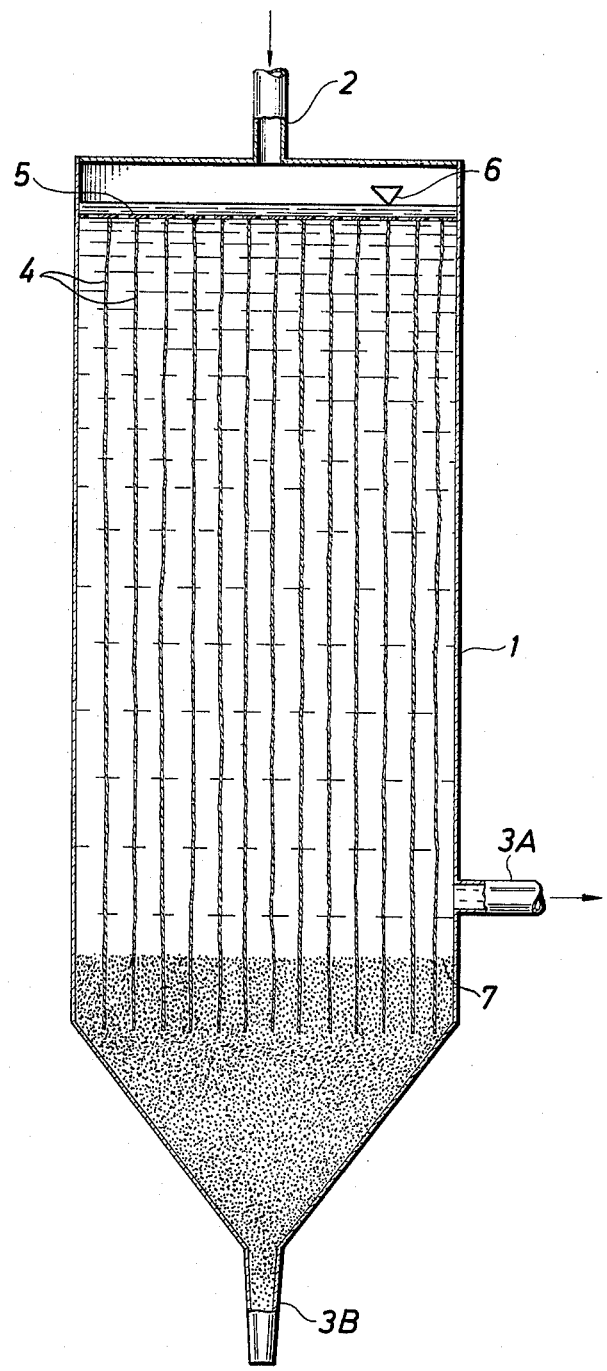

METHOD AND APPARATUS FOR BIOLOGICAL PURIFICATION

The present invention relates to a method and an apparatus for biological purification of liquid wastes, e.g. waste waters, which comprises contacting the wastes with active micro-organisms on a carrier for the purpose of degrading organic impuritis present in the wastes. The invention also relates to a method of imparting bacteriophilic properties to a surface of a silicious material.

A method, known and in use for a long time for biological purification of waste waters, i.e. purification of waters containing biochemically, oxygen demanding organic matter, commonly termed BOD matter, comprises using a so called biological filter or trickling filter. Purification is accomplished by means of microorganisisms which degrade and decompose the organic matter to innocuous salts and minerals. According to this method the wastes are caused to filter through a bed of, e.g., sand or stone, which bed is a carrier for the micro-organisms. However, such a bed is so tight or dense that it will retain the degradation products which means that in time it will be saturated and must be exchanged or regenerated. Besides being time-consuming and expensive, it also means that the bed cannot be utilized some time, i.e., during the time when the bed is being exchanged or regenerated. Beds of this type are disclosed in e.g. U.S. Pat. No. 2,237,711 and Swedish Pat. No. 215,691.

In an attempt so solve the problem of clogging of the biological filter an apparatus of the type disclosed in, for instance, U.S. Pat. Nos. 3,238,124 and 3,407,935 has been utilized. The apparatus disclosed therein contains freely hanging, substantially individualized bark fibers supporting the micro-organisms. However, a great disadvantage associated with the use of bark fibers is, on one hand, that these fibers will be consumed by the micro-organisms, which means that they must be replaced by new fibers. On the other hand, the bark fibers will themselves be degraded to contaminating substances.

The next stage of development was to utilize carriers of inert materials, which is disclosed in U.S. Pat. No. 3,617,541 and Swedish Pat. Appln. Ser. No. 73-08380-0. However, to obtain an adequate degradation by means of the micro-organisms it was necessary to utilize these carriers in the shape of a fabric of woven glass fibers such as is disclosed in U.S. Pat. No. 3,617,541, or a dense sheet or sheeting of mineral wool such as is disclosed in Swedish Patent Appln. Ser. No. 73-08380-0, i.e. as closely composed fiber elements. This meant a stage backwards in the direction of the above-mentioned biological filter.

In accordance with the present invention it has become possible to eliminate the above-mentioned drawbacks. Thus, by means of the method and apparatus according to the invention, it has become possible to utilize solely the advantages associated with substantially individualized fibers and with inert materials respectively, an objective which has been sought for a long time but which has hitherto not been feasible.

The object of the invention is achieved by means of the improvements disclosed below and in the appended claims.

The invention is based on the discovery that, by imparting to the surface of an inert, silicious material, a layer of colloidal silica, a substrate is obtained which retains and promotes the growth of active micro-organisms to such an extent that the carrier may be utilized in a configuration that is much more open than those dense fabrics, sheetings or sheets which previously had to be used.

Thus, generally the present invention relates to a method of imparting bacteriophilic properties to the surface of a silicious material, which comprises preparing or applying a layer of colloidal silica thereupon.

The preferred silicious material is glass and the inventive idea is applicable to the silicious material in any shape, including sheets, balls, fibers, etc. According to a preferable embodiment, however, the silicious material is utilized in a waste purification method and apparatus as a carrier in the shape of substantially individualized fiber elements.

In the present case the expression "substantially individualized fiber elements" refers to fibers, filaments or similar elongated elements which are present in an essentially individual form. Thus, contrary to the previously utilized fabrics or sheetings the elements are not joined into systems having crosswisely arranged fibers and the like. For the sake of simplicity the term "fibers" is used below.

As used herein the term "colloidal silica" refers to an open, amorphous structure on the surface, a silica gel. With reference to the term "silica" it should be interpreted in its broadest sense, including any silicious substance, i.e. of, relating to, derived from, or containing silica or silicate.

In accordance with the invention, it has been discovered that the attachment of the micro-organisms to the colloidal silica is so strong that the carrier can be utilized even in the form of vertically arranged and, preferably, freely hanging fibers. This is an especially preferred embodiment of the invention, since with such arrangement of the fibers, there is no tendency to clogging. Furthermore, with this arrangement of the fibers, the flow resistance through the fibers is extremely low. However, the practice of the invention is not limited to the use of vertically disposed fibers; but any inclination, including horizontal, is possible. The advantage with vertically disposed fibers is, however, that a free oscillation of one end of the fibers is enabled.

Especially advantageous results are obtained in accordance with the invention when disposing the fibers separated from each other by a distance of about 2 - 5 millimeters.

In addition to the fact that there is no clogging in the method according to the invention, the fact that the carrier material is inert, i.e. the carrier is not affected or consumed by the micro-organisms, means that the method may be performed completely continuous without any interruption for regeneration or exchange of carrier material. Furthermore, it has been discovered that, in accordance with the present invention, dead micro-organisms will be detached from the carrier material by themselves, the shape of the carrier being such that the dead microorganisms will not accumulate in the purification apparatus but will automatically fall down among the wastes being drawn off from the apparatus.

As mentioned, a preferred silicious material is glass. However, any silicious material, for instance mineral fibers, is useful. As only the material of the surface layer is of interest for the purpose of the present invention, the fibers need not be homogeneous. Thus, they may also comprise a core of an inert or non-inert material having a coating or a surface layer of silicious material.

The step of imparting a colloidal silica layer to the silicious material is performed in such a way that the surface layer, in addition to being porous, will be well anchored to the underlying material and will also be relatively neutral from an ionic point of view. The preferred method of achieving this is to etch the surface so as to leach out the alkali metal and alkaline earth metal ions which are relatively easily movable in the structure of the silicious material. This is preferably performed in any of the following ways.

1. Etching in an alkaline solution with subsequent neutralisation with acid.
2. Etching with liquid or gaseous hydrogen fluoride, fluosilicic acid ($H_2SiF_6$), ammonium salts of these or other hydrofluoric acid derivatives with subsequent neutralisation and washing.
3. Etching with phosphoric acid or phosphoric acid derivatives, citrates, NTA or other complex-forming agents with subsequent neutralisation or reprecipitation alternatively with complex-forming agents for the reprecipitation of colloidal silica on the surface of glass.

As used herein the term "etching" includes dissolving the surface layer of the silicious material in the form of silicate, as well as applying to the surface a layer of silicate or silica.

The micro-organisms utilized in practicing the present invention comprise micro-organisms previously used in connection with biological purification, e.g. aerobic and anaerobic bacteria. Since a preferred embodiment of the invention is to utilize the filter substantially completely filled up with water, as is further illustrated below, the degradation should, however, preferably be performed substantially anaerobically.

The micro-organisms are applied to the carrier in any known manner, e.g. by contacting the carrier before being fitted into the purification apparatus or after having been fitted into said apparatus, with a micro-organism culture.

Of course, the apparatus in accordance with the invention may be utilized in combination with other purification means, if desired. Thus, the liquid wastes may, for instance, before being passed into the apparatus according to the invention, be desludged for the removal of coarse, solid particles. However, because of the shape of the present carrier, this initial de-sludging stage may be eliminated in many cases, since even relatively coarse particles can pass the carrier without any risk of clogging of the same.

The invention will now be described in conjunction with the accompanying single FIGURE of drawing which schematically shows a preferred embodiment of the apparatus, in the form of a water purification filter, for carrying out the method of the invention. In this context it should be noted that the filter does not differ structurally from many known filter configurations, which is the reason why the filter is shown schematically only and why some common means are not shown in the drawing. The essential feature of the invention is the carrier and the way in which it is utilized.

The water purification filter shown in the drawing comprises a container 1 having a top inlet 2, a side wall outlet 3A, and a bottom outlet 3B. In the container 1 there are vertically disposed glass fibers 4 hanging freely from a lattice 5 fixed to container 1, adjacent inlet 2. Inlet 2 and outlets 3A and 3B are provided with regulating means (not shown) for the regulation (including cut-off) of the flow rate of the waters.

When operating the filter the contaminated water is passed into container 1 through inlet 2, outlets 3A and 3B being closed, until the water level 6 exceeds the lattice 5. The feed of the water is preferably performed by means of a distribution means (not shown) distributing the water equally over the fibers 4 which carry the micro-organisms necessary for the purification.

While still keeping the outlet 3B closed, outlet 3A is opened. By means of the regulating means in inlet 2 and outlet 3A, the water flow is regulated so as to maintain a residence time for the contaminated water which is sufficient to accomplish the desired degradation of the organic contaminants, to maintain a preferably constant water level 6 above lattice 5, and to obtain a sedimentation of the sludge to the bottom of container 1 without the sludge being carried by the purified water through the outlet 3A.

When the sludge level 7 above the bottom of container 1 becomes too high, outlet 3B is opened for the drainage of sludge. By hanging freely in the container 1 the fibers 4 are able to oscillate in such a way that there is no clogging of the filter and that dead micro-organisms will be detached and fall down into the sludge, thereby enabling the filter to be operated in a continuous manner.

The invention will be further illustrated by the following non-limiting examples.

EXAMPLE 1

Into a glass tube there was introduced a "wad" of loosely packed glass fibers, the surface of which had been treated with an alkaline solution with subsequent neutralisation with acid. A similar "wad" of untreated glass fibers was introduced into the same type of glass tube. A culture of bacteria, having the total number of bacteria per ml stated in the table below, was then introduced into the two glass tubes. The bacterial amount was changed by growth in the "glass fiber mass", so that the number of bacteria in the substrate taken out of the tubes was larger than when introduced into the tubes. The results are summarized in Table 1 below:

Table 1

| Total number of bacteria from the beginning | Total number of bacteria on taken-out, untreated glass-fibers | Total number of bacteria on taken-out, treated glass-fibers |
|---|---|---|
| 1,000 | about 5,000 | about 10,000 |
| 5,000 | about 7,500 | about 18,000 |
| 8,000 | about 16,000 | about 30,000 |
| 10,000 | about 20,000 | about 45,000 |
| 50,000 | about 30,000 | about 70,000 |

From the Table it is obvious that a surface treatment of the glass fibers imparts a considerable increase of the bacteriological activity to the filter. In general the increase of the bacterial amount in the case of untreated glass fibers was in the order of 50–100 percent, as compared with an increase in the order of 300–400 percent on treated glass fibers.

EXAMPLE 2

In a tube of the size $\phi$ bundles of E-glass fibers (so called roving), 20 cm × 115 cm long were hung over the whole cross sectional area, with a distance of about 2mm between each bundle. The remainder of the structure of the filter is as shown in the drawing. The filter was filled with water which was then made alkaline to a pH of about 13. After about 16 hours at room temperature the solution was made acid to a pH of about 6.

After rinsing, a preaerated municipal sewage (after primary sedimentation) was passed through the filter at a rate of flow of about 5 liters per hour, corresponding to a residence time of about 3 hours. After about 2 days of continuous flow $BOD_7$, COD and turbidity (relative numbers) were observed and recorded for the inlet as well as outlet waters. The tests were repeated twice and results obtained are summarized in Table 2.

Table 2

| Run No. | $BOD_7$ in | $BOD_7$ out | COD in | COD out | Turbidity in | Turbidity out |
|---|---|---|---|---|---|---|
| I | 380 | 10 | 685 | 370 | 140 | 4.5 |
| II | 3000 | 130 | — | — | 43 | 8 |
| III | 460 | 30 | 825 | 200 | 73 | 8.1 |

What is claimed is:

1. In a method for biological purification of liquid wastes, e.g. waste waters, wherein the wastes are contacted with active micro-organisms on a carrier for the purpose of achieving degradation of organic contaminants, the improvement which comprises using a carrier of freely hanging, vertically disposed, substantially individualized fiber elements having at least a surface layer of an inert, silicious glass material the surface of which comprises a layer of colloidal silica.

2. The method of claim 1, wherein the space between adjacent fiber elements is between about 2 and 5 millimeters.

3. The method of claim 1, wherein the layer of colloidal silica is substantially ionically netural.

4. The method of claim 3, wherein the layer of colloidal silica is achieved by etching.

5. The method of claim 4, wherein the etching is achieved by an alkaline solution with a subsequent neutralisation with an acid.

6. The method of claim 4, wherein the etching is achieved by a substance selected from the group consisting of liquid and gaseous hydrogen fluoride, fluosilicic acid ($H_2SiF_6$), and ammonium salts of these and other derivatives of hydrofluoric acid, with subsequent neutralisation and washing.

7. The method of claim 4, wherein the etching is achieved by a substance selected from the group consisting of phosphoric acid and phosphoric acid derivatives, citrates, NTA and other complex forming agents with subsequent neutralisation or reprecipitation.

8. The method of claim 4, wherein the etching is achieved by complex-forming agents for the reprecipitation of colloidal silica.

9. In an apparatus for the biological purification of liquid wastes, such as waste waters, including a container having an inlet for liquid wastes, an outlet for purified wastes, a carrier for microorganisms, and means for fixing the carrier into the container, the improvement which comprises a carrier of vertically disposed, freely hanging, substantially individualized fiber elements having at least a surface layer of an inert, silicious glass material, the surface of said glass material comprising a layer of colloidal silica.

10. The apparatus of claim 9, wherein the layer of colloidal silica is substantially ionically netural.

11. The apparatus of claim 10, wherein the layer of colloidal silica has been achieved by etching.

12. The apparatus of claim 11, wherein the etching was achieved by an alkaline solution with a subsequent neutralisation with an acid.

13. The apparatus of claim 11, wherein the etching was achieved by a substance selected from the group consisting of liquid and gaseous hydrogen fluoride, fluosilicic acid ($H_2SiF_6$), and ammonium salts of these and other derivatives of hydrofluoric acid, with subsequent neutralisation and washing.

14. The apparatus of claim 11, wherein the etching was achieved by a substance selected from the group consisting of phosphoric acid and phosphoric acid derivatives, citrates, NTA and other complex-forming agents with subsequent neutralisation or reprecipitation.

15. The apparatus of claim 11, wherein the etching was achieved by complex-forming agents for the reprecipitation of colloidal silica.

16. The apparatus of claim 9, wherein the outlet comprises a side wall outlet for purified liquid and a bottom outlet for sludge.

17. The apparatus of claim 9, wherein the space between adjacent fiber elements is between about 2 and 5 millimeters.

18. In an apparatus for biological purification of liquid wastes, e.g. waste waters, including a container having a top inlet for the liquid wastes, a side wall outlet for purified liquid and a bottom outlet for sludge, a carrier for microorganisms, and means for fixing the carrier into the container, the improvement which comprises a carrier of freely hanging, vertically disposed, substantially individualized fiber elements having at least a surface layer of an inert, silicious glass material the surface of said material comprising a layer of colloidal silica.

19. The apparatus of claim 18, wherein the layer of colloidal silica is substantially ionically netural.

20. The apparatus of claim 19, wherein the layer of colloidal silica has been achieved by etching.

21. The apparatus of claim 20, wherein the etching was achieved by an alkaline solution with a subsequent neutralisation with an acid.

22. The apparatus of claim 20, wherein the etching was achieved by a substance selected from the group consisting of liquid and gaseous hydrogen fluoride, fluosilicic acid ($H_2SiF_6$), and ammonium salts of these and other derivatives of hydrofluoric acid, with subsequent neutralisation and washing.

23. The apparatus of claim 20, wherein the etching was achieved by a substance selected from the group consisting of phosphoric acid and phosphoric acid derivatives, citrates, NTA and other complex-forming agents with subsequent neutralisation or reprecipitation.

24. The apparatus of claim 20, wherein the etching was achieved by complex-forming agents for the reprecipitation of colloidal silica.

* * * * *